(12) United States Patent
Marler et al.

(10) Patent No.: US 9,731,739 B2
(45) Date of Patent: Aug. 15, 2017

(54) SHELVING BASE FRAME (71) Applicants: Jon R. Marler, Syracuse, IN (US); John L. Earnest, Marion, IN (US)

(72) Inventors: Jon R. Marler, Syracuse, IN (US); John L. Earnest, Marion, IN (US)

(*) Notice: Subject to any disclaimer, the term of this patent is extended or adjusted under 35 U.S.C. 154(b) by 0 days.

(21) Appl. No.: 14/985,135

(22) Filed: Dec. 30, 2015

(65) Prior Publication Data
US 2016/0186921 A1 Jun. 30, 2016

Related U.S. Application Data
(60) Provisional application No. 62/098,124, filed on Dec. 30, 2014.

(51) Int. Cl.
B62B 3/00 (2006.01)
A47F 5/10 (2006.01)
A47F 5/13 (2006.01)
A47B 91/00 (2006.01)

(52) U.S. Cl.
CPC ............ B62B 3/002 (2013.01); A47B 91/002 (2013.01); A47F 5/108 (2013.01); A47F 5/137 (2013.01)

(58) Field of Classification Search
CPC ....... B62B 3/002; A47B 91/002; A47F 5/108; A47F 5/137
USPC .......... 248/346.5, 129; 280/47.26, 47.31, 35, 280/79.11
See application file for complete search history.

(56) References Cited

U.S. PATENT DOCUMENTS

| | | | | |
|---|---|---|---|---|
| 2,990,191 A * | 6/1961 | Black | ................. | B60B 33/0002 16/21 |
| 3,523,694 A * | 8/1970 | Oliver | ................ | A47B 87/0207 108/53.3 |
| 8,141,683 B1 * | 3/2012 | Wurth | ..................... | B66M 19/00 182/223 |
| 8,246,059 B2 * | 8/2012 | Gass | ........................ | F16M 3/00 248/651 |
| 9,394,078 B1 * | 7/2016 | Roberts | .............. | B65D 19/0073 |
| 2005/0229819 A1 * | 10/2005 | Hollander | .......... | B65D 19/0026 108/51.3 |
| 2013/0146553 A1 * | 6/2013 | Preidt | ....................... | A47F 5/00 211/153 |

* cited by examiner

Primary Examiner — Anita M King (57) ABSTRACT

A shelving base bracket is an apparatus that is used to support and transport shelving units. The shelving base includes a rectangular frame which is made up of a plurality of lateral cross members. Each of the lateral cross members includes a base panel and a border panel. The base panel may be used to support a shelving platform for storing goods. The border panel provides structural strength to the lateral cross member and may be used to prevent items from falling off the shelving base frame. The shelving base frame also includes a plurality of corner brackets which is used to reinforce the connections between each of lateral cross members. Each of the plurality of lateral cross members is connected in-between two corner brackets. The plurality of corner brackets may be used to attach a shelving unit to the shelving base frame.

11 Claims, 7 Drawing Sheets

SHELVING BASE FRAME

The current application claims a priority to the U.S. Provisional Patent application Ser. No. 62/098,124 filed on Dec. 30, 2014.

FIELD OF THE INVENTION

The present invention relates generally to the shelving units. More specifically, the present invention is a freestanding base frame that is used to support, transport, store, and display shelving units and merchandise.

BACKGROUND OF THE INVENTION

Shelving units are widely used in commercial, industrial, and residential settings. For commercial and industrial purposes, it is often advantageous to make use of stationary shelving units as well as shelving units or methods of transporting merchandise or materials. When transporting goods between storage and the storefront, carts or pallets are often used to carry the merchandise. Pallets are generally useful for transferring large quantities of merchandise; however, pallets generally require the use of forklifts or similar machinery. Carts may be effectively used for transferring varying quantities of products, but generally go unused after the products have been transported. This can lead to wasting storage space.

The present invention is a shelving base frame which allows for numerous shelves to be stacked vertically using standard parts and without the need for fasteners. The shelving base frame is multipurpose because it may be used for stationary shelving, and also provides a means of mounting caster wheels for transporting merchandise. As a result, the present invention may be used for displaying, storing, and/or transporting merchandise. When not in use, multiple shelving base frames without caster wheels can be stacked onto each other to minimize required storage space. The shelving base frame is universal because it allows for 4-way fork entry and can be nested on a pallet if preferred.

DETAILED DESCRIPTION OF THE INVENTION

All illustrations of the drawings are for the purpose of describing selected versions of the present invention and are not intended to limit the scope of the present invention.

Figure 1:
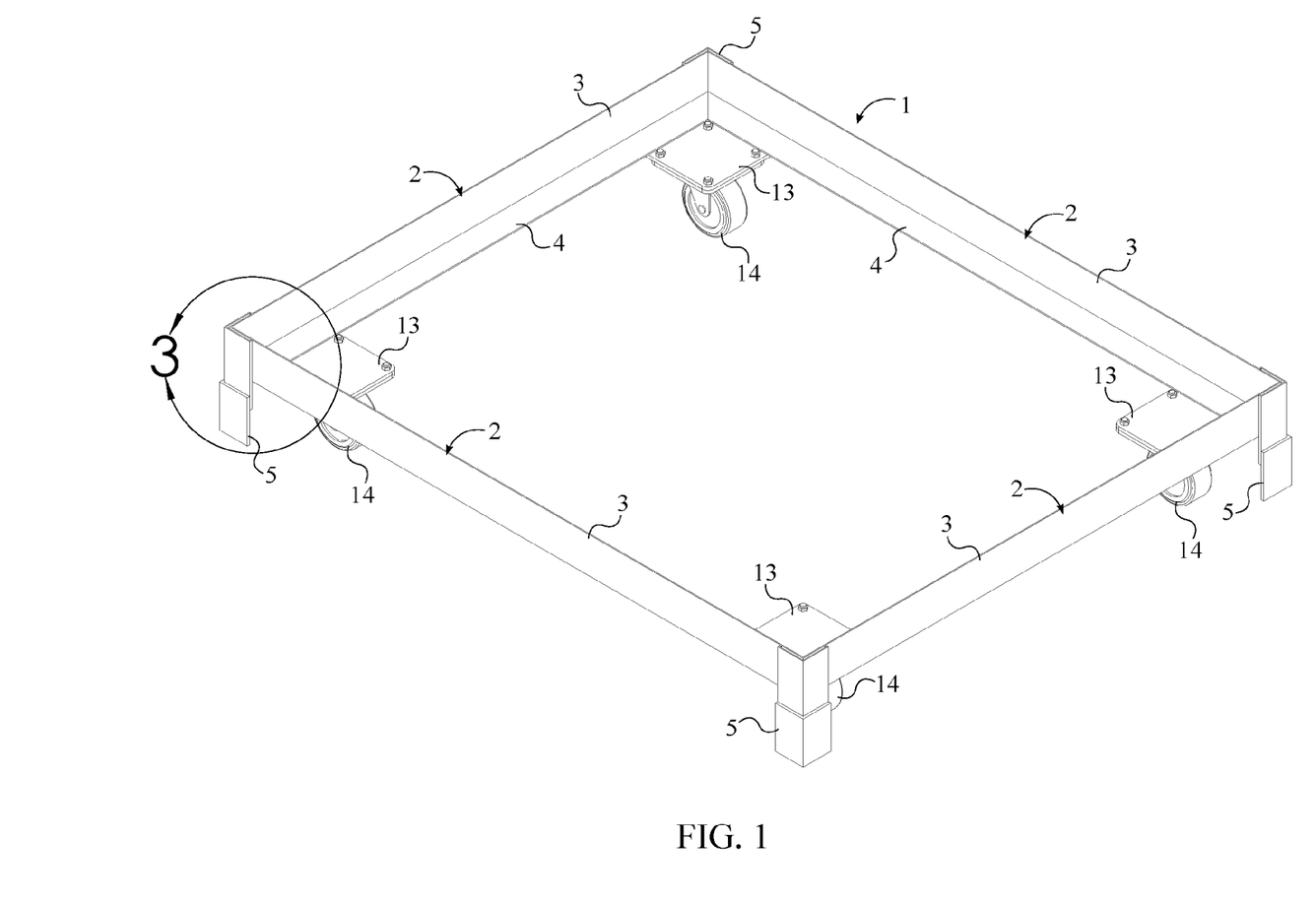
FIG. 1 is a top perspective view of the present invention.
Figure 2:
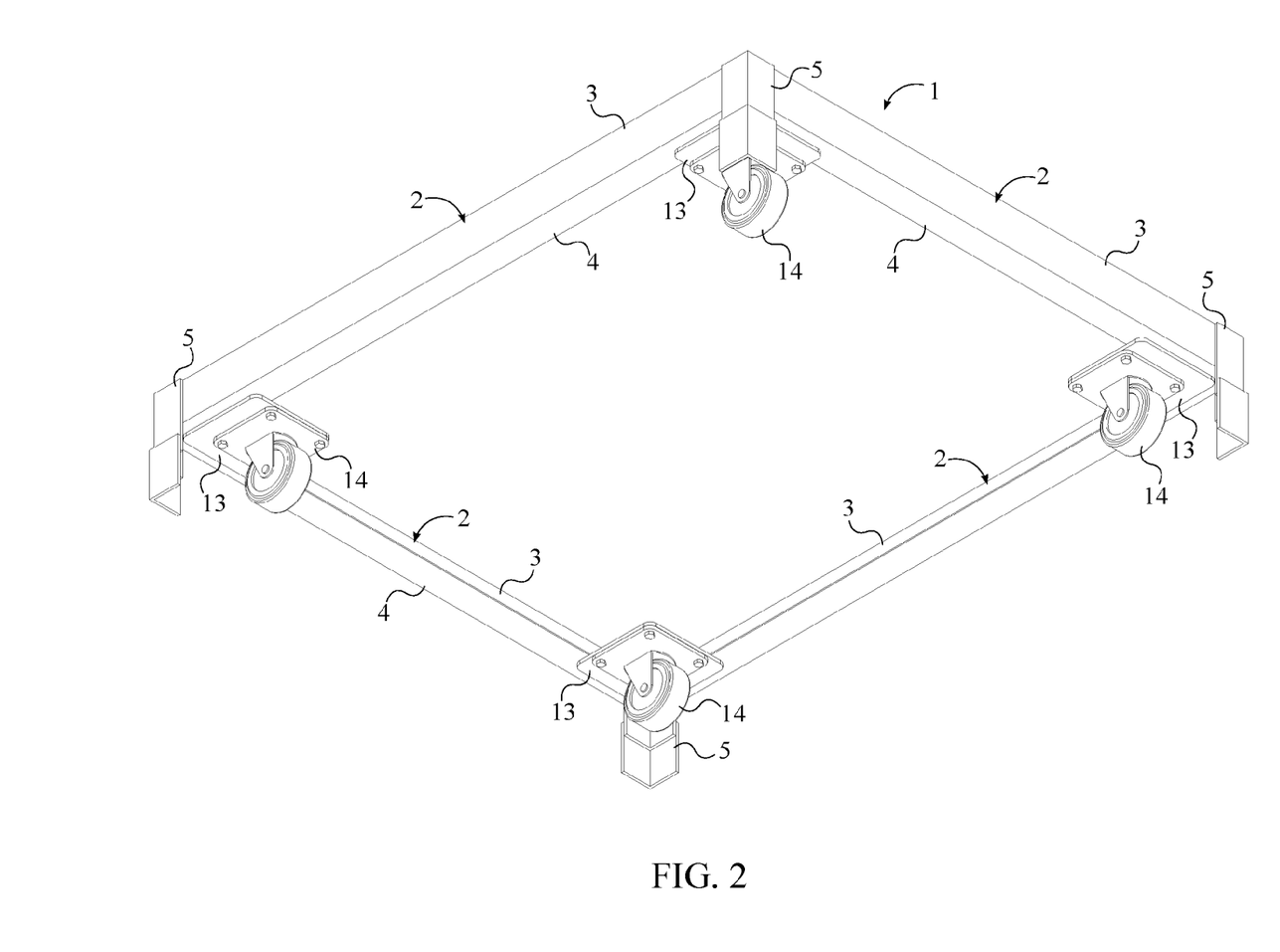
FIG. 2 is a bottom perspective view of the present invention.
Figure 7:
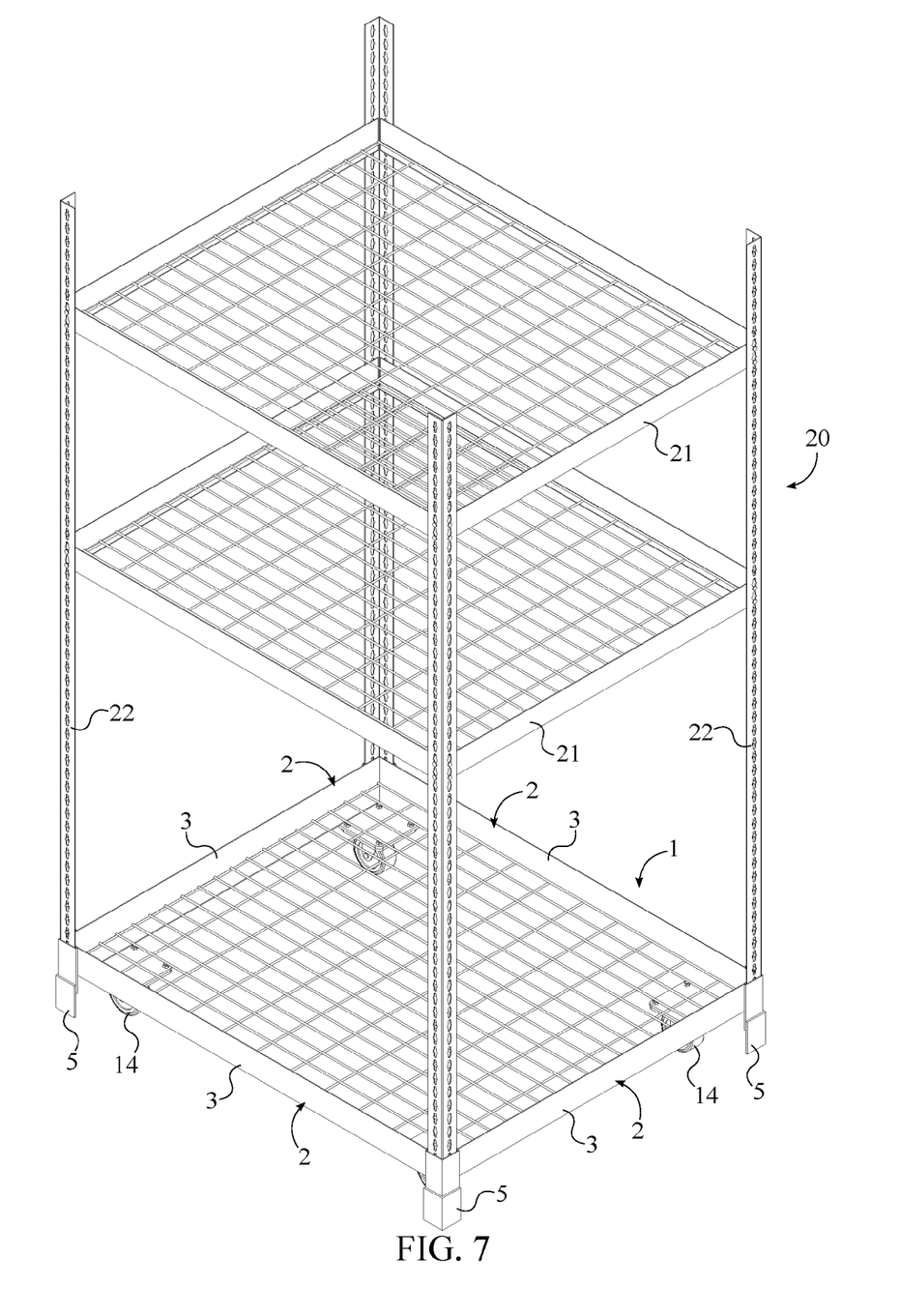
FIG. 7 is a perspective view of the present invention used to support a shelving unit.

With reference to FIGS. 1-2 and FIG. 7, the present invention is a shelving base frame that may be used to support a shelving unit 20 which includes multiple rows of shelves 21 and vertical shelving supports 22. The present invention comprises a rectangular frame 1 and a plurality of corner brackets 5. The rectangular frame 1 functions as a sturdy foundation for supporting the shelving unit 20 and any items stacked on the shelving unit 20. The rectangular frame 1 comprises a plurality of lateral cross members 2. In the preferred embodiment of the present invention, the rectangular frame 1 is made from steel; however, alternative materials may also be used. To form the shape of the rectangular frame 1, each of the plurality of lateral cross members 2 is positioned perpendicular to two adjacent cross members from the plurality of lateral cross members 2. The plurality of lateral cross members 2 may differ in size, depending on the needs of the user or the size of the shelving unit 20. Each of the plurality of lateral cross members 2 comprises a border panel 3 and a base panel 4. The base panel 4 from each of the plurality of lateral cross members 2 is aligned coplanar with each other. This arrangement allows the base panels 4 to be used to support a shelving platform used to store goods. The border panel 3 is connected perpendicular and along the base panel 4. The border panel 3 for each of the plurality of lateral cross members 2 delineates the outer perimeter of the rectangular frame 1 and may be used to prevent items from falling off of the shelving platform supported by the base panels 4. Each of the plurality of lateral cross members 2 is connected in between two adjacent corner brackets from the plurality of corner brackets 5. The plurality of corner brackets 5 is used to stabilize the perpendicular connections between each of the plurality of lateral cross members 2. Moreover, each of the plurality of corner brackets 5 is used to secure vertical shelving supports 22 to the rectangular frame 1.

Figure 3:
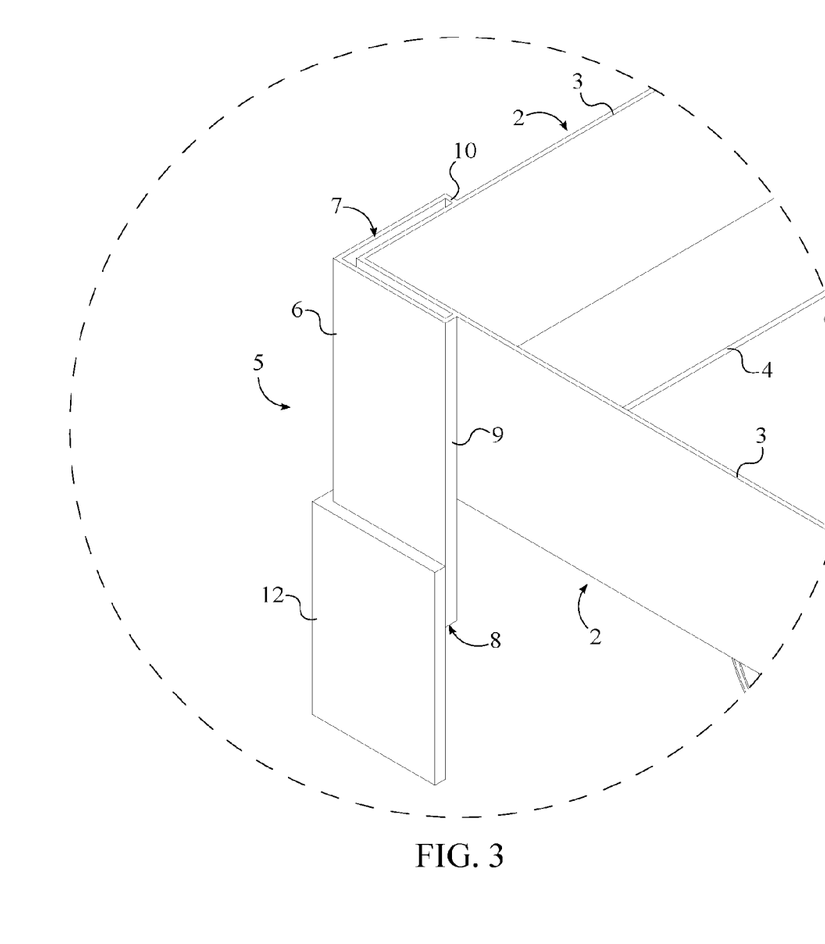
FIG. 3 is a detail view taken from the circle 3 in FIG. 1.
Figure 4:
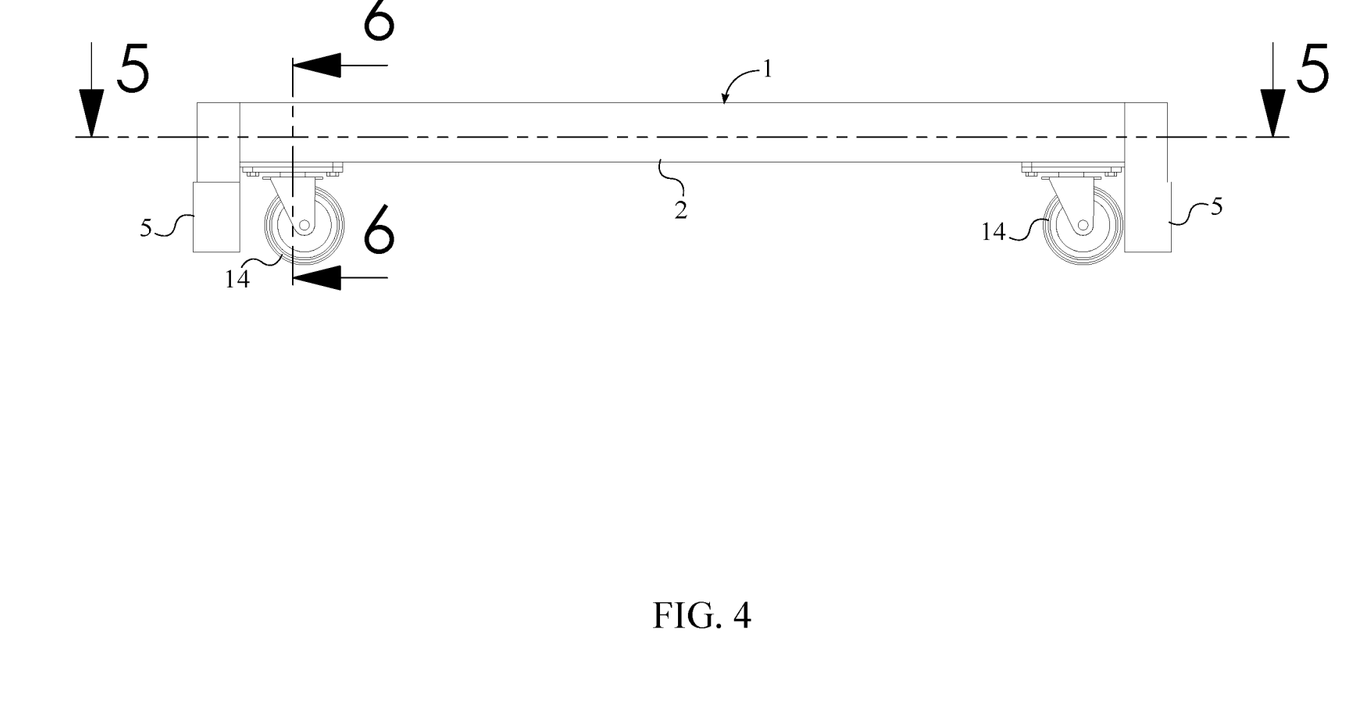
FIG. 4 is a front view of the present invention.
Figure 5:
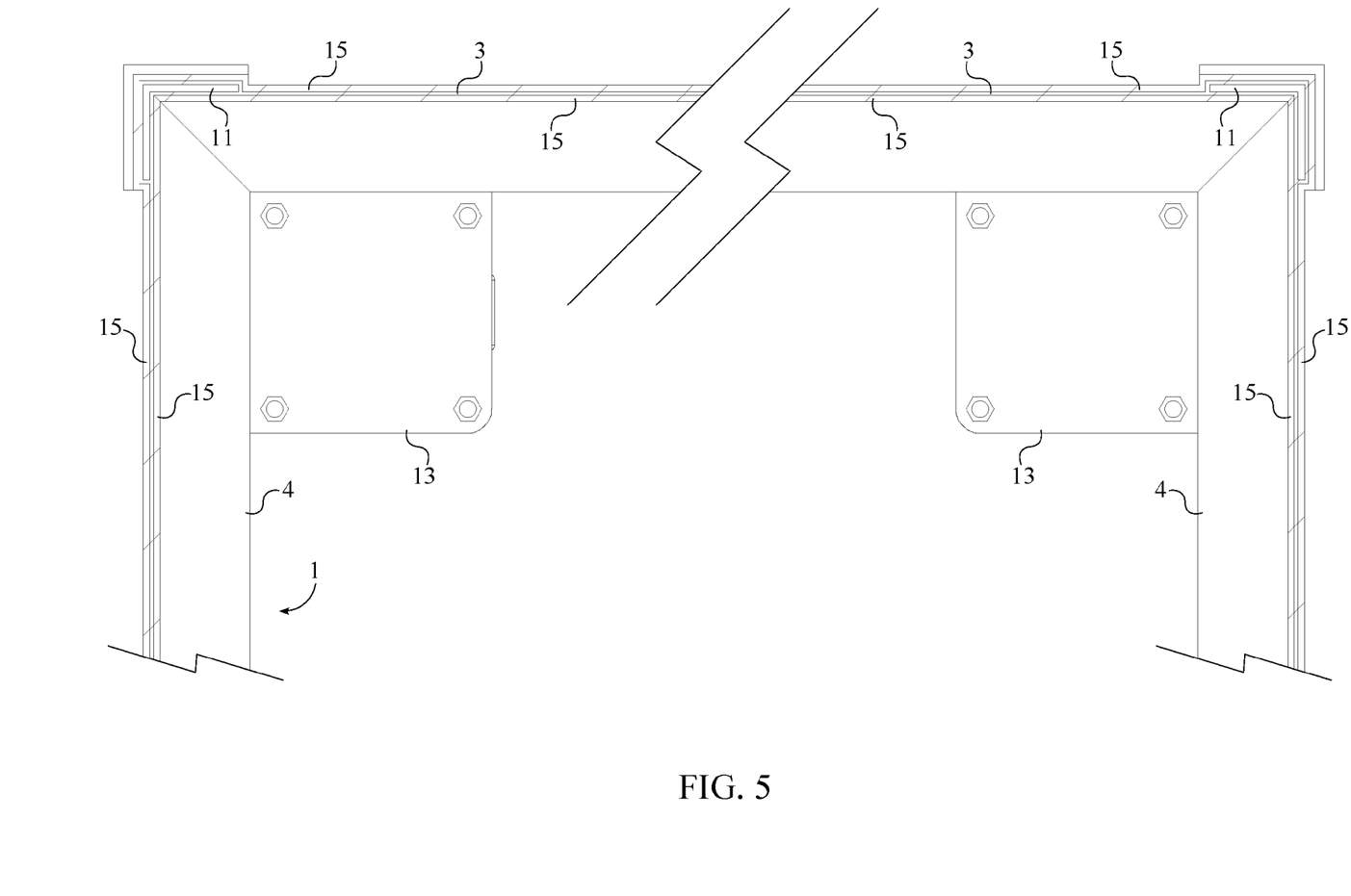
FIG. 5 is a schematic section view of the present invention taken about the line 5-5 in FIG. 4, wherein the weatherproof coating is shown covering the lateral cross members and the corner brackets.

In reference to FIGS. 3-5, each of the plurality of corner brackets 5 comprises a corner jacket 6, a first spacer 9, a second spacer 10, and a support stop 11. The first spacer 9 and the second spacer 10 are positioned opposite to each other across the corner jacket 6. The first spacer 9 is connected in between the corner jacket 6 and a first corresponding cross member from the plurality of lateral cross members 2. The second spacer 10 is connected in between the corner jacket 6 and a second corresponding cross member from the plurality of lateral cross members 2. The first corresponding cross member and the second corresponding cross member are positioned adjacent to each other. This arrangement allows the first spacer 9 and the second spacer 10 to offset the corner jacket 6 from the rectangular frame 1. Because the corner jacket 6 is offset from rectangular frame 1 at the perpendicular connection between the first corresponding cross member and the second corresponding cross member, a vertical shelving support 22 may be inserted in between the rectangular frame 1 and the corner jacket 6. The support stop 11 is connected in between the corner jacket 6 and the perpendicular connection between the first corresponding cross member and the second corresponding cross member. The support stop 11 is also connected in between the first spacer 9 and the second spacer 10. When a vertical shelving support 22 is placed into the space between the corner jacket 6 and the rectangular frame 1, the support stop 11 is used to support the weight of the shelving unit 20.

In reference to FIG. 3, each of the plurality of corner brackets 5 further comprises a reinforcement support 12. The reinforcement support 12 adds structural stability to the present invention and also allows multiple shelving base frames to stack onto each other. Alternatively, this feature allows multiple shelving base frames to be stored in a compact manner while not in use. The corner jacket 6 comprises a first end 7 and a second end 8. The reinforcement support 12 is laterally connected to the corner jacket 6, opposite to the perpendicular connection between the first corresponding cross member and the second corresponding cross member. In the preferred embodiment of the present invention, the reinforcement support 12 is welded to the rectangular frame 1; however, in alternative embodiments of the present invention, other methods of connecting the reinforcement support 12 to the rectangular frame 1 may be used. The reinforcement support 12 is positioned offset from the first end 7 such that when the present invention is placed on the ground, each of the reinforcement supports 12 touches the ground.

In reference to FIG. 2, the present invention further comprises a plurality of caster pads 13. The plurality of caster pads 13 allows caster wheels 14 to be mounted to the rectangular frame 1. The rectangular frame 1 is positioned around the plurality of caster pads 13, thus keeping the shelving base frame as compact as possible. The plurality of caster pads 13 is positioned parallel to the base panel 4 for each of the plurality of lateral cross members 2. Each of the plurality of caster pads 13 is connected to the base panel 4 of two adjacent cross members from the plurality of lateral cross members 2. This arrangement allows each of the caster pads 13 to evenly distribute the weight of a shelving unit 20. Moreover, the aforementioned arrangement ensures that if caster wheels 14 are mounted to the rectangular frame 1, each of the caster wheels 14 will be able to pivot and rotate equally.

The present invention further comprises a plurality of caster wheels 14. Each of the plurality of caster wheels 14 is mounted adjacent to a corresponding pad from the plurality of caster pads 13, opposite to the rectangular frame 1. In the preferred embodiment of the present invention, each of the plurality of caster wheels 14 is bolted to the corresponding pad; however, other mounting methods may alternatively be used. When the present invention is placed on the ground, the plurality of caster wheels 14 contacts the ground, while each of the reinforcement supports 12 is slightly elevated above the ground. As a result, the plurality of caster wheels 14 allows the shelving base frame to be mobile. This is useful for transporting large quantities of shelved products without the use of a forklift or other machinery. In the preferred embodiment of the present invention, the plurality of caster wheels 14 is mounted such that multiple shelving base frames may be stacked without interfering with each of the caster wheels 14.

Figure 6:
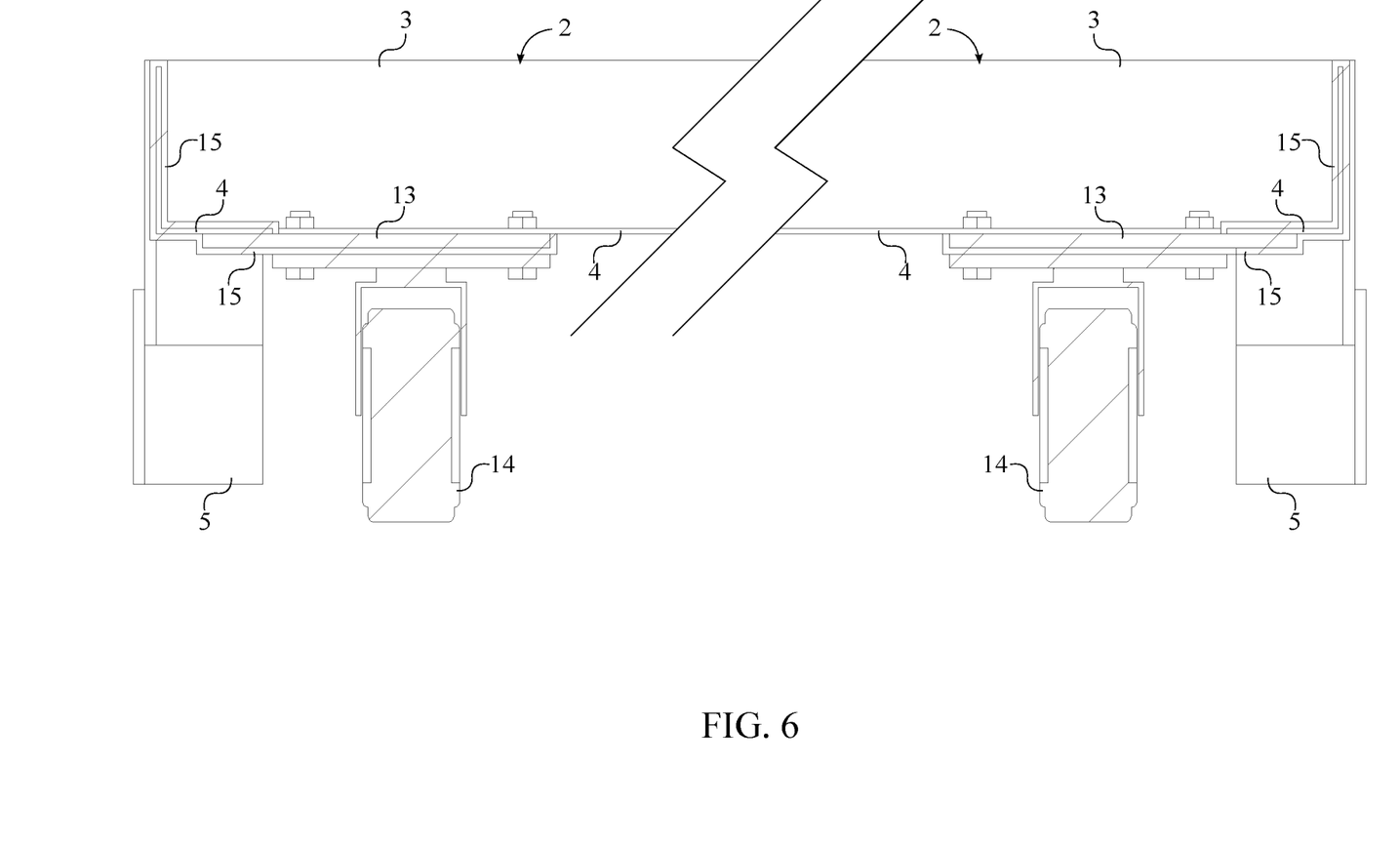
FIG. 6 is a schematic section view taken about the line 6-6 in FIG. 4, wherein the weatherproof coating is shown covering the lateral cross members and the caster pads.

In reference to FIGS. 5-6, the present invention further comprises a weatherproof coating 15. The weatherproof coating 15 may be a painted coating or powder coated finish applied to the present invention. The weatherproof coating 15 is externally layered onto the rectangular frame 1, the plurality of corner brackets 5, and the plurality of caster pads 13. The weatherproof coating 15 is used to protect the present invention from rust, general wear and tear, and other potentially harmful environmental elements.

Although the invention has been explained in relation to its preferred embodiment, it is to be understood that many other possible modifications and variations can be made without departing from the spirit and scope of the invention as hereinafter claimed.

What is claimed is:
1. A shelving base frame comprising:
a rectangular frame;
a plurality of corner brackets;
the rectangular framed comprising a plurality of lateral cross members;
each of the plurality of lateral cross members comprising a border panel and a base panel;
the border panel being connected perpendicular and along the base panel;
each of the plurality of lateral cross members being connected in between two adjacent corner brackets from the plurality of corner brackets;
each of the plurality of lateral cross members being positioned perpendicular to two adjacent cross members from the plurality of lateral cross members;
the base panel from each of the plurality of lateral cross members being aligned coplanar with each other;
each of the plurality of corner brackets comprising a corner jacket, a first spacer, a second spacer, and a support stop;
the first spacer and the second spacer being positioned opposite to each other across the corner jacket;
the first spacer being connected in between the corner bracket and a first corresponding cross member from the plurality of lateral cross members;
the second spacer being connected in between the corner bracket and a second corresponding cross member from the plurality of lateral cross members, wherein the first corresponding cross member and the second corresponding cross member being positioned adjacent to each other;
the support stop being connected in between the corner jacket and the perpendicular connection between the first corresponding cross member and the second corresponding cross member;
the support stop being connected in between the first spacer and the second spacer
each of the plurality of corner brackets further comprising a reinforcement support;
the corner jacket comprising a first end and a second end;
the reinforcement support being laterally connected to the corner jacket, opposite to the perpendicular connection between the first corresponding cross member and the second corresponding cross member; and
the reinforcement support being positioned offset from the first end.

2. The shelving base frame as claimed in claim 1 further comprising:
a plurality of caster pads;
the rectangular frame being positioned around the plurality of caster pads;
the plurality of caster pads being positioned parallel to the base panel for each of the plurality of lateral cross members; and
each of the plurality of caster pads being connected to the base panel of two adjacent cross members from the plurality of lateral cross members.

3. The shelving base frame as claimed in claim 2 further comprising:
a plurality of caster wheels; and
each of the plurality of caster wheels being mounted adjacent to a corresponding pad from the plurality of caster pads, opposite to the rectangular frame.

4. The shelving base bracket as claimed in claim 2 further comprising:
a weatherproof coating; and
the weatherproof coating being externally layered onto the rectangular frame, the plurality of corner brackets, and the plurality of caster pads.

5. A shelving base frame comprising:
a rectangular frame;
a plurality of corner brackets;

the rectangular frame comprising a plurality of lateral cross members;

each of the plurality of lateral cross members comprising a border panel and a base panel;

each of the plurality of corner brackets comprising a corner jacket, a first spacer, a second spacer, and a support stop;

the border panel being connected perpendicular and along the base panel;

each of the plurality of lateral cross members being connected in between two adjacent corner brackets from the plurality of corner brackets;

each of the plurality of lateral cross members being positioned perpendicular to two adjacent cross members from the plurality of lateral cross members;

the base panel from each of the plurality of lateral cross members being aligned coplanar with each other;

the first spacer and the second spacer being positioned opposite to each other across the corner jacket;

the first spacer being connected in between the corner bracket and a first corresponding cross member from the plurality of lateral cross members;

the second spacer being connected in between the corner bracket and a second corresponding cross member from the plurality of lateral cross members, wherein the first corresponding cross member and the second corresponding cross member being positioned adjacent to each other;

the support stop being connected in between the corner jacket and the perpendicular connection between the first corresponding cross member and the second corresponding cross member;

the support stop being connected in between the first spacer and the second spacer;

each of the plurality of corner brackets further comprising a reinforcement support;

the corner jacket comprising a first end and a second end;

the reinforcement support being laterally connected to the corner jacket, opposite to the perpendicular connection between the first corresponding cross member and the second corresponding cross member; and the reinforcement support being positioned offset from the first end.

6. The shelving base frame as claimed in claim 5 further comprising:

a plurality of caster pads;

the rectangular frame being positioned around the plurality of caster pads;

the plurality of caster pads being positioned parallel to the base panel for each of the plurality of lateral cross members; and each of the plurality of caster pads being connected to the base panel of two adjacent cross members from the plurality of lateral cross members.

7. The shelving base frame as claimed in claim 6 further comprising:

a plurality of caster wheels; and each of the plurality of caster wheels being mounted adjacent to a corresponding pad from the plurality of caster pads, opposite to the rectangular frame.

8. The shelving base bracket as claimed in claim 6 further comprising:

a weatherproof coating; and the weatherproof coating being externally layered onto the rectangular frame, the plurality of corner brackets, and the plurality of caster pads.

9. A shelving base frame comprising:

a rectangular frame;

a plurality of corner brackets;

a plurality of caster pads;

the rectangular frame comprising a plurality of lateral cross members;

each of the plurality of lateral cross members comprising a border panel and a base panel;

the border panel being connected perpendicular and along the base panel;

each of the plurality of lateral cross members being connected in between two adjacent corner brackets from the plurality of corner brackets;

each of the plurality of lateral cross members being positioned perpendicular to two adjacent cross members from the plurality of lateral cross members;

the base panel from each of the plurality of lateral cross members being aligned coplanar with each other;

the rectangular frame being positioned around the plurality of caster pads;

the plurality of caster pads being positioned parallel to the base panel for each of the plurality of lateral cross members;

each of the plurality of caster pads being connected to the base panel of two adjacent cross members from the plurality of lateral cross members;

each of the plurality of corner brackets comprising a corner jacket, a first spacer, a second spacer, and a support stop;

the first spacer and the second spacer being positioned opposite to each other across the corner jacket;

the first spacer being connected in between the corner bracket and a first corresponding cross member from the plurality of lateral cross members;

the second spacer being connected in between the corner bracket and a second corresponding cross member from the plurality of lateral cross members, wherein the first corresponding cross member and the second corresponding cross member being positioned adjacent to each other;

the support stop being connected in between the corner jacket and the perpendicular connection between the first corresponding cross member and the second corresponding cross member;

the support stop being connected in between the first spacer and the second spacer;

each of the plurality of corner brackets further comprising a reinforcement support;

the corner jacket comprising a first end and a second end;

the reinforcement support being laterally connected to the corner jacket, opposite to the perpendicular connection between the first corresponding cross member and the second corresponding cross member; and the reinforcement support being positioned offset from the first end.

10. The shelving base frame as claimed in claim 9 further comprising:

a plurality of caster wheels; and each of the plurality of caster wheels being mounted adjacent to a corresponding pad from the plurality of caster pads, opposite to the rectangular frame.

11. The shelving base bracket as claimed in claim 9 further comprising:

a weatherproof coating; and the weatherproof coating being externally layered onto the rectangular frame, the plurality of corner brackets, and the plurality of caster pads.

* * * * *